US005258776A

United States Patent [19]

Guy et al.

[11] Patent Number: 5,258,776

[45] Date of Patent: Nov. 2, 1993

[54] HIGH RESOLUTION THERMAL PRINTERS INCLUDING A PRINT HEAD WITH HEAT PRODUCING ELEMENTS DISPOSED AT AN ACUTE ANGLE

[75] Inventors: William F. Guy, Rochester; Thomas A. Mackin, Hamlin, both of N.Y.

[73] Assignee: Eastman Kodak Company, Rochester, N.Y.

[21] Appl. No.: 749,037

[22] Filed: Aug. 23, 1991

[51] Int. Cl.[5] .......................... B41J 2/45; H04N 1/21

[52] U.S. Cl. .................................. 346/76 L; 346/108

[58] Field of Search ................ 346/76 L, 76 PH, 108, 346/140 R

[56] References Cited

U.S. PATENT DOCUMENTS

| | | | |
|---|---|---|---|
| 4,739,415 | 4/1988 | Toyono et al. | 346/140 R X |
| 4,978,974 | 12/1990 | Etzel | 346/108 X |
| 5,164,742 | 11/1992 | Baek et al. | 346/76 L |
| 5,168,288 | 12/1992 | Baek et al. | 346/76 L |

*Primary Examiner*—A. T. Grimley
*Assistant Examiner*—William J. Royer
*Attorney, Agent, or Firm*—Robert L. Randall

[57] ABSTRACT

The present invention relates to thermal printers including a thermal print head mounting a plurality of N thermal heating devices such as lasers or resistive heating elements. In the thermal printer, a receiver member is mounted on a rotating drum with a dye carrier member engaging the outer surface of the receiver member in a dye frame image printing area. The thermal heating devices are aligned at a predetermined acute angle Θ to a line normal to the rotation of the drum. During the high speed rotation of the drum, the thermal heating devices are selectively energized by micropixel clock pulses which are synchronized to the rotational speed of the drum. During each rotation of the drum, N columns of micropixels are printed on the receiver member. Additionally, the energizing of each of the thermal heating elements is timed using the micropixel clock pulses so as to print corresponding micropixels of the N columns of micropixels in a line normal to the rotation of the drum. As the drum is rotating at a high speed, the print head is translated normal to the direction of rotation of the drum to print all of the (N×M) columns of the dye frame image next to each other with a $\frac{1}{8}$ micropixel resolution.

15 Claims, 3 Drawing Sheets

HIGH RESOLUTION THERMAL PRINTERS INCLUDING A PRINT HEAD WITH HEAT PRODUCING ELEMENTS DISPOSED AT AN ACUTE ANGLE

FIELD OF THE INVENTION

The present invention relates to thermal dye transfer printers which provide high resolution micropixel printing.

BACKGROUND OF THE INVENTION

In a thermal printer, a dye carrier member containing one or more dye colors is disposed between a receiver member, such as paper, and a print head assembly formed of one or more thermal elements often referred to as thermal pixels. When a thermal pixel is energized, the heat produced causes a dye color from the dye carrier member to transfer to the receiver member engaging an outside surface of a rotatable drum. The density (darkness) of the printed dye is a function of the temperature of the thermal pixel and the time the dye carrier member is heated (the energy delivered from the thermal pixel to the dye carrier member). Thermal dye transfer printers offer the advantage of true "continuous tone" dye density transfer. This transfer is obtained by varying the energy applied to each thermal pixel which results in a variable dye density image pixel on the receiver member.

A first type of print head is formed with a plurality of resistive thermal elements forming the thermal pixels. The thermal pixels are usually organized into a plurality of groups of thermal pixels. The thermal pixels in each group are simultaneously addressed in parallel, and each group is addressed sequentially one at a time. In this manner, a smaller and less expensive power supply is needed than required when all of the thermal pixels are energized at the same time. In this regard see, for example, U.S. Pat. No. 4,621,271 (S. A. Brownstein, issued on Nov. 4, 1986) which describes method and apparatus for controlling a thermal printer arranged with a plurality of groups of thermal pixels. When a group of thermal pixels are addressed, the thermal pixels are each selectively energized and are driven by a constant voltage. More particularly, a technique is described which addresses the thermal pixels of each group a plurality of N times during a line printing period, and has means for selectively energizing each of the thermal pixels of each group when they are addressed. In this manner each thermal pixel supplies thermal energy to the dye carrier member which substantially corresponds to a desired dye color density to be reproduced in an image pixel on the receiver member.

A second type of thermal printer employs one or more laser beams which are each selectively energized as the beam impinges or scans the surface of the dye carrier member past each thermal pixel area. The heat which is provided as the laser beam impinges the dye carrier member in each pixel area determines the density level (amount of dye color transferred) on the receiver member in the pixel area. An exemplary thermal dye transfer printing apparatus using an array of semiconductor diode lasers is disclosed, for example, in U.S. Pat. No. 4,804,975 (K. Yip, issued on Feb. 14, 1989). Means are provided for controlling the laser diodes to produce light and modulate the light from the individual lasers to provide sufficient energy to cause different amounts of dye to transfer from the dye carrier member to the receiver member and form pixels with different levels of density.

With laser thermal printers, precise pixel resolution on the receiver member is required under certain conditions as, for example, for creating 4-color proofs (defined in the graphic arts industry as the output from the thermal printer). In order to print dots (micropixels) at, for example, 1800 and 2400 dots per inch (dpi), it is desirable that the laser thermal printer maintain a small fractional part of micropixel resolution. When writing onto, for example, a receiver member wrapped about a writing drum, synchronization of pixel timing must repeat at regular intervals. Slight changes in rotational speed or pixel timing has a cumulative effect in compromising the accuracy needed for creating the 4-color image. This requirement for accurate synchronization of the pixel timing is compounded by the need to be able to print dots at more than one dpi value (e.g., 1800 and 2400 dpi). The problem is to provide a thermal printer capable of providing such micropixel resolution.

SUMMARY OF THE INVENTION

The present invention is directed to a thermal dye transfer apparatus capable of printing N columns of micropixels during each revolution of a high speed drum with a $\frac{1}{8}$ micropixel resolution. More particularly, the thermal dye transfer apparatus transfers dye from a dye carrier member to a receiver member mounted on a rotatable drum by heating the dye in the dye carrier member to produce a dye frame image. The apparatus comprises a print head, means for generating a predetermined number of micropixel timing pulses which are synchronized to predetermined radial positions of the drum as the drum is rotating, and means responsive to the micropixel timing pulses and to image signals indicative of a dye density level at each micropixel of the dye frame image to be reproduced on the receiver member for sequentially energizing each of the plurality of N heat producing elements. The print head comprises a plurality of N heat producing elements for producing a selective amount of heat at each of a plurality of N micropixels on the dye carrier member. The selective energization of each heat producing elements selectively transfers a predetermined amount of the dye from the dye carrier member to the receiver member. Additionally, the plurality of N elements are aligned at a predetermined acute angle Θ from a line normal to the direction of rotation of the drum, where 0<Θ'90 degrees;

The means for sequentially energizing each of the plurality of N heat producing elements functions to produce N separate columns of micropixels of the dye frame image during each rotation of the drum. Additionally, corresponding micropixels of the N columns of micropixels are aligned in parallel substantially normal to the rotation of the drum on the receiver member.

In the thermal dye transfer apparatus described above, the rotatable cylindrical drum has a predetermined circumference for mounting the receiver member thereon such that the distance around the circumference is at least as large as a length of the dye frame image to be printed on the receiver member. The apparatus further comprises means responsive to drum position signals indicating radial positions of the drum during the rotation thereof for producing micropixel timing signals which are a non-fractional multiple of a rate of the drum position signals and are synchronized to the rotational speed of the drum.

The invention will be better understood from the following more detailed description taken with the accompanying drawings and claims.

The drawings are not necessarily to scale.

DETAILED DESCRIPTION

Figure 1:
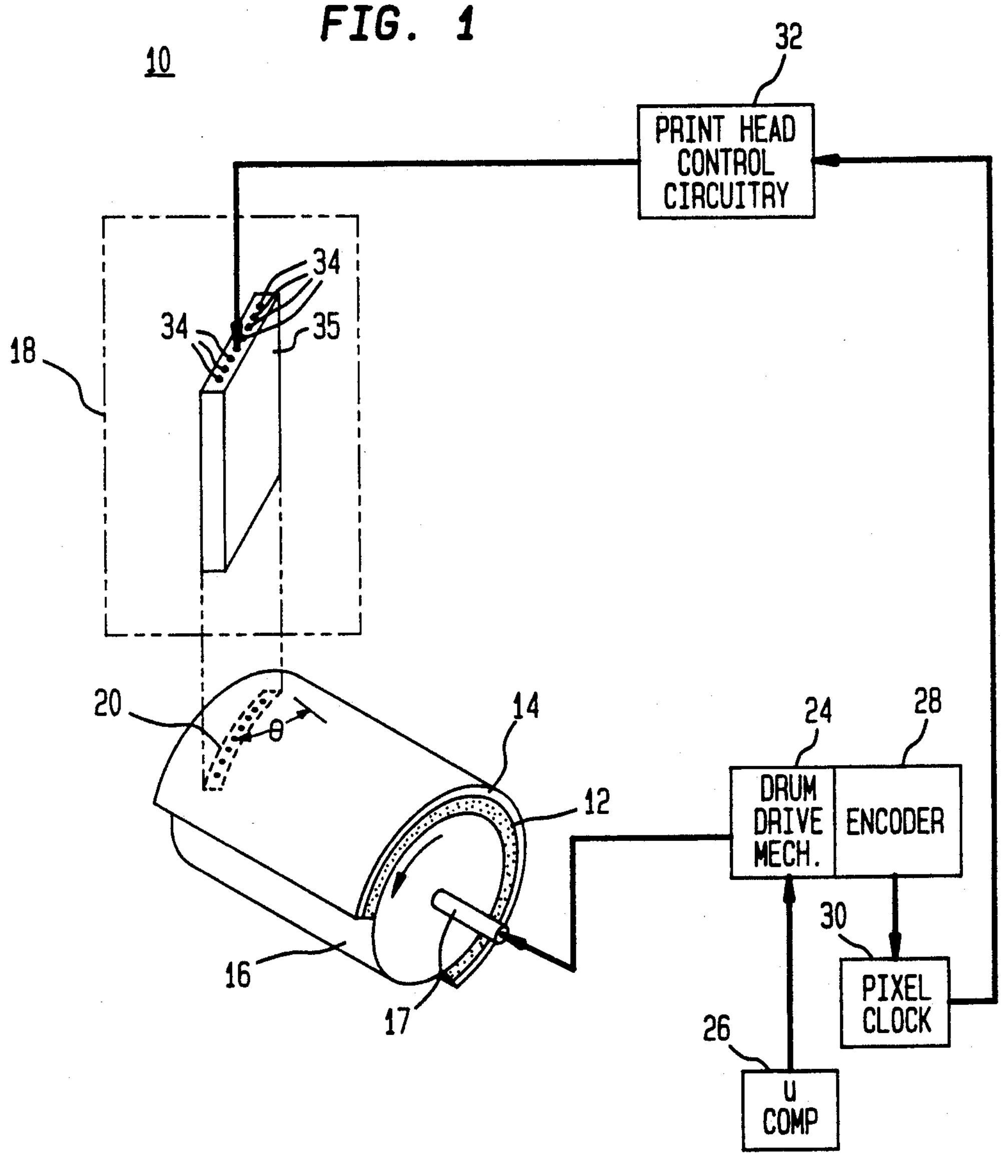
FIG. 1 is a schematic block diagram of an exemplary arrangement of a laser thermal printer in accordance with the present invention.

Referring now to FIG. 1, there is shown a thermal printer lo in accordance with the present invention. The thermal printer 10 comprises a receiver member 12, a dye carrier member 14, a cylindrical drum 16 with a shaft 17, a laser thermal print head 18 (shown within a dashed line rectangle), a drum drive mechanism 24, a microcomputer (u comp.) 26, an encoder 28, a pixel clock 30, and print head control circuitry 32. The thermal print head 18 comprises a plurality of N lasers 34 mounted in a mounting 35. More particularly, the output light beam from each laser 34 is focused onto a predetermined micropixel area 20 of the dye carrier member 14 (shown in a dashed line rectangle). Although shown above the dye carrier member, the print head 18 is preferably disposed to engage the dye carrier member 14. In accordance with the present invention, the plurality of lasers 34 are aligned to provide light beams therefrom which impinge the dye carrier member 14 in a line which is skewed by a predetermined angle Θ from a longitudinal axis of the drum 16 corresponding to the shaft 17. The purpose of aligning the lasers at the angle Θ is provided in the discussion of FIG. 4 hereinafter. The thermal printer 10 is arranged to print a dye frame image on the receiver member 12 from a dye transferred from the dye carrier member 14 by the heat generated by the light beam from each of the lasers 34 on the dye carrier member 14.

The dye carrier member 14 is in the form of a web which is shown mounted on top of the receiver member 12. The dye carrier member 14 has a frame of dye of, for example, cyan, magenta, yellow or black on the dye carrier member 14 as shown, for example, in FIG. 3 of U.S. Pat. No. 4,621,271 (Brownstein) cited hereinbefore. Therefore, the dye from the particular dye frame of the dye carrier member 14 engaging the receiver member 12 is transferred to the receiver member. The amount of dye transferred to the receiver member 12 is dependent on the heat produced by the laser beam impinging the dye carrier member 14 in each micropixel area. Each of the different dye carrier frames are used in sequence to deposit a predetermined amount (density level) of that dye onto each of the micropixels of an image being formed on the receiver member 12 so as to accurately reproduce the colors of an original image. In the thermal printer 10 of FIG. 1, a first dye frame of, for example, cyan is mounted on the receiver member 12, and a cyan dye frame image is printed as will be described in more detail hereinafter. Once the first dye frame is completed, it is removed and a second dye frame of magenta is mounted on the receiver member 12, and the magenta dye frame image is printed. This process is repeated for each of the yellow and black dye frames sequentially mounted on the receiver member 12 to complete a 4-color image.

The receiver member 12, in the form of a sheet of material such as paper, is secured to, and positioned around, a portion of the rotatable drum 16 which has its shaft 17 rigidly coupled to the drum drive mechanism 24 and the encoder 28. The thermal printer 10 secures the receiver member 12 to the drum 16 by, for example, selectively applying a vacuum from a source (not shown) to a central cavity (not shown) of the drum 16. The vacuum in the cavity is extended to the underside of a receiver member 12 placed on the drum 16 through ports extending through an outer shell of the drum 16. The dye carrier member 14 is mounted on the receiver member 12 by any suitable means including the use of the vacuum securing the receiver member 12 to the drum 16. It is to be understood that any other suitable technique can be used for securing the receiver member 12 to the outer surface of the drum, and for maintaining the dye carrier member 14 in contact with the receiver member 12 during the printing operation. For purposes of explanation hereinafter, it is assumed that the receiver member 12 (e.g., a sheet of paper) has a predetermined length which is less than the circumference of the drum 16 and a predetermined width which is less than the width of the drum 16. As will be shown hereinafter, the circumferential dimension of the drum 16 is an important aspect of the present invention.

The drum drive mechanism 24 includes a motor (not shown) adapted to rotate the drum 16 and the receiver member 12 under the thermal print head 18 at a predetermined speed which is controlled by the microcomputer 26. The encoder 28 is a known element and is rigidly connected to the shaft 17 of the drum 16. The encoder 28 translates a plurality of X radial positions of the drum 16 into a plurality of X electrical output pulses (drum position pulses) per revolution of the drum 16. The encoder 28 output pulses are delivered via an output channel to the pixel clock 30. For purposes of explanation and example only, and not for purposes of limitation, it is assumed hereinafter that encoder 28 provides 50,000 pulses per revolution of the drum 16.

During printing, while the lasers 34 are being energized under the control of the print head control circuitry 32, the receiver member 12 and the dye carrier member 14 are continuously rotated at a predetermined rate of speed. In operation, a receiver member 12 having a width and length which is greater than the image to be reproduce is affixed to the drum 16. The receiver member 12 is positioned on the drum 16 so that the first and last lines of the image to be reproduced lie adjacent opposite ends of the receiver member 12. The dye carrier member 14 is positioned on the receiver member 12. Drive signals (not shown) are continuously provided to the drum drive mechanism 24 from the microcomputer 26 to rotate the drum 16 at a predetermined speed. The drum 16 rotation brings the print region of the receiver member 12 opposite the laser beams from the thermal print head 18 during each revolution of the drum 16. A dye frame (not shown) on the dye carrier member 14 containing a particular dye color is positioned between the print head 18 and the receiver member 12 during the printing of a dye image. The receiver member 12 and the dye carrier member 14 are moved relative to the print head 18 during the printing operation of a multi-color image. The start point for printing a first line of a dye frame image on the receiver member 12 can be determined by any suitable technique. For example, as the drum 16 is rotating at a predetermined speed, detecting means (not shown) can be used to detect the top edge of, or an index mark on, the receiver member 12. Once the top edge or the index mark is detected, the printing of a dye frame image is started at the start point of the first line of the image relative to such top edge or index mark.

Figure 2:
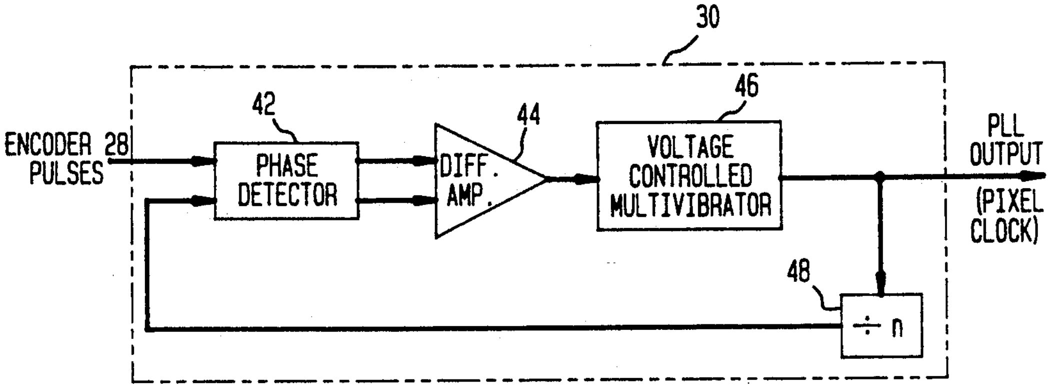
FIG. 2 is a block diagram of a an integer phase lock loop which is used to generate the pixel clock in the laser thermal printer of FIG. 1.

Referring now to FIG. 2, there is shown an exemplary block diagram of the pixel clock 30 (shown within a dashed line rectangle) of FIG. 1. The pixel clock 30 has the form of a phase lock loop comprising a phase detector 42, a differential amplifier 44, a voltage controlled multivibrator 46 and a divide-by-n circuit 48. As the drum 16 rotates, the pixel clock 30 receives pulses from the encoder 28 at a first input to the phase detector 42. A second input to the phase detector 42 is provided from an output of the divide-by-n circuit 48. The phase detector 42 has two outputs which indicate a predetermined point (e.g., the leading edge) of each pulse received from the encoder 28 and the divide-by-n circuit 48, respectively. The two outputs from the phase detector 42 are compared in the differential amplifier 44. The differential amplifier 44 provides a d-c output signal that is proportional to the difference in phase of the pulses from the encoder 28 and the divide-by-n circuit 48. The d-c output signal from differential amplifier 44 is used to selectively adjust the frequency of the voltage controlled multivibrator 46 to synchronize the pixel clock pulses at the output of the pixel clock 30 to the rotational speed of the drum 16.

Figure 3:
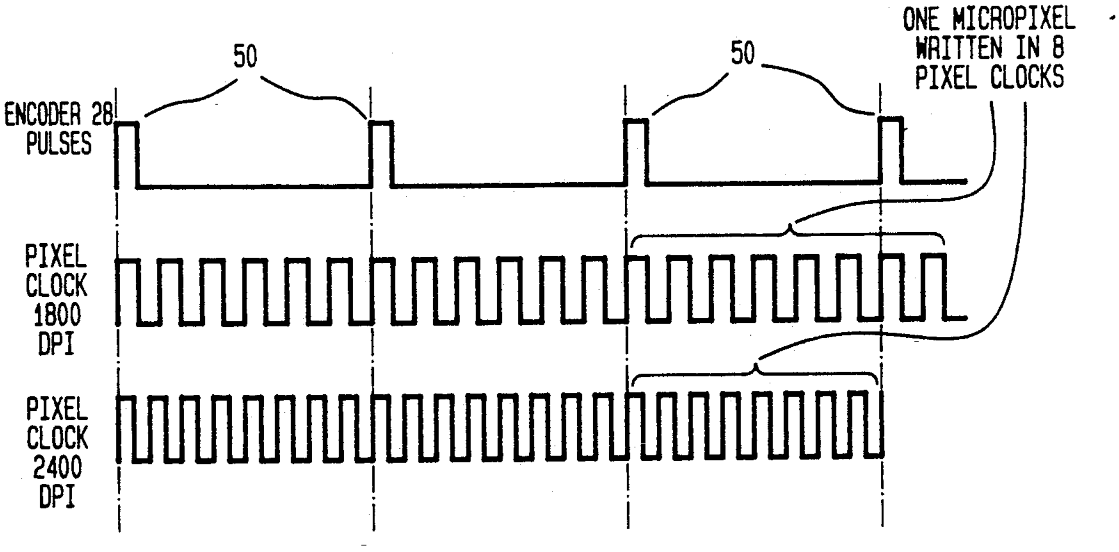
FIG. 3 shows, typical encoder pulses and related exemplary pixel clock pulses for printing 1800 dots per inch (dpi) and 2400 dpi in accordance with the present invention.

Referring now to FIG. 3, there are shown typical pulses from (a) the encoder 28, and (b) the pulses of the pixel clock 30 at the output of the voltage controlled multivibrator 46 of FIG. 2 for printing 1800 or 2400 dots per inch (dpi) of an image on the receiver member 12. In FIG. 3, four encoder pulses 50 are shown of the exemplary 50,000 pulses from encoder 28 for each revolution of the drum 16. The frequency of the voltage controlled multivibrator 46 of FIG. 2 is arranged to selectively provide "n" output pulses from the pixel clock 30 between sequential encoder pulses 50 for printing a dye frame image at a predetermined dots per inch (dpi). For printing 1800 or 2400 dpi, the pixel clock 30 provides 6 or 8 pulses, respectively, ($n=6$ or 8) between each of the encoder pulses 50. The divide-by-n circuit 48 provides output pulses at the rate of the encoder pulses 50. Any difference in phase between the encoder pulses 50 and the corresponding pulses from the divide-by-n circuit 48 is detected by the combination of the phase detector 42 and the differential amplifier 44. The differential amplifier 44 is responsive to a phase difference between each of the pulses of the two input signals detected by the phase detector 42 to alter the output d-c voltage by a predetermined amount. The voltage controlled multivibrator 46 is responsive to a change in the output d-c voltage from the differential amplifier 44 to change its frequency sufficiently to synchronize the output pixel clock pulses with the encoder pulses 50. The synchronized pixel clock pulses at the output of pixel clock 30 are transmitted to the print head control circuitry 32 as shown in FIG. 1. As indicated in FIG. 3, one micropixel is written during each 8 pixel clock pulses regardless of the dots per inch (1800 or 2400 dpi) printed in accordance with the present invention.

The print head control circuitry 32 has a configuration similar to that of laser array control circuitry shown in FIG. 3 of U.S. Pat. No. 4,804,975 (K. Yip, issued on Feb. 14, 1989). More particularly, selective energizing signals (not shown) are provided to each of the lasers 34 of the thermal print head 18 by the print head control circuitry 32. These selective energizing signals are based on image signals defining each image micropixel to be reproduced from an image signal source (not shown) and the pixel clock pulses from the pixel clock 30. The energizing signals to each of the lasers 34 are used to generate light beams that selectively heat the micropixel areas on the dye carrier member 14 and cause a predetermined amount of the dye from the particular dye frame to be transferred from the dye carrier member 14 to the receiver member 12. As the receiver member 12 moves through the printing region opposite the thermal print head 18, the selective energization of the lasers 34 results in the printing of a dye frame image on the receiver member 12. The color of this dye frame image is determined by the color of the thermally transferable dye contained in the particular dye frame of the dye carrier member 14 that is moved into the printing region. After one complete dye frame of a 4-color image is printed during one or more rotations of the drum 16, the receiver member 12 is returned to the start point, or "home" position. Concurrent therewith, a dye carrier member 14 with a different dye frame color is positioned on the receiver member 12 for printing the next dye frame image on top of the first dye frame image with a predetermined micropixel resolution. The lasers 34 in the print head 18 are again selectively energized in order to superimposed the next dye frame of the 4-color image on any other previously printed color frame of that image. This process is repeated until all of the different dye frames needed to produce the desired 4-color image are superimposed on the receiver member 12.

Assuming that the print head control circuitry 32 is arranged to produce K possible dye density levels at each micropixel of a dye color, then each energizing signal includes a predetermined one-of-K value corresponding to the density level desired at a predetermined micropixel area. The energizing signal is delivered to a predetermined laser 34 that causes the light beam impinging the predetermined micropixel area to have an intensity that produces the corresponding one-of-K level of heat at the predetermined micropixel area on the dye carrier member 14. The one-of-K level of heat causes a predetermined amount of dye corresponding the one-of-K density level to be transferred to the receiver member 12 in the predetermined micropixel area 20.

Figure 4:
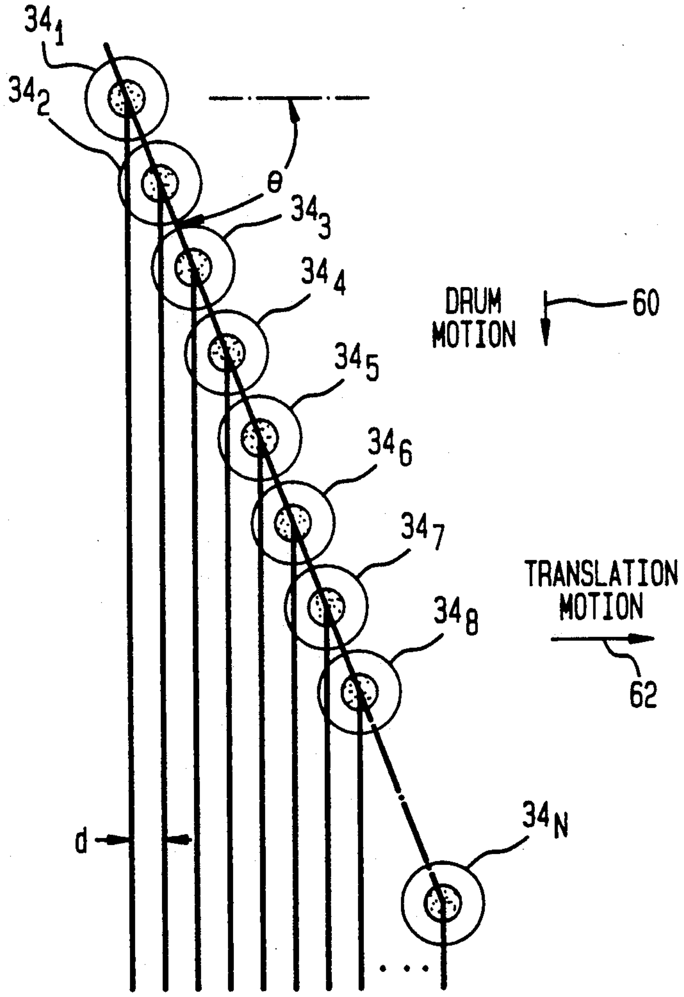
FIG. 4 shows an exemplary arrangement of a plurality of lasers in the laser print head of the thermal printer of FIG. 1 in accordance with the present invention.

Referring now to FIG. 4, there is shown an arrangement of a plurality of N lasers $34_1$ to $34_N$ in the print head 18 of which lasers $34_1$, $34_2$, $34_3$, $34_4$, $34_5$, $34_6$, $34_7$, $34_8$, and $34_N$ are shown. The plurality of lasers $34_1$ to $34_N$ are aligned and equally spaced. The line of lasers 34 are oriented at a predetermined acute angle $\Theta$ to the width of the receiver member 12 corresponding to a line normal to the direction of rotation 60 of the drum 16 in accordance with the present invention. The angle $\Theta$ is preferably near 90 degrees to provide the close micropixel spacing needed for printing the exemplary 1800 or 2400 dots per inch (dpi). More particularly, due to the smallness of the micropixels that are being written at 1800 dpi (0.000556 inch/micropixel) and 2400 dpi (0.0004167 inch/micropixel), a conventional print head oriented parallel to the width of the receiver member 12 cannot be built to provide such spacings. In accordance with the present invention, by adjusting the angle Θ of the line of lasers 34 in FIG. 4, the horizontal distance "d" between lasers 34 along the direction of translation motion 62 can be made as small as necessary. The horizontal spacing "d" between adjacent lasers 34 represents the micropixel density of the image being printed on the receiver member 12. The number "N" of lasers 34 that are used in the thermal print head 18 is determined by economies of scale only. The laser printer 10 will work whether there are 2 or 200 lasers 34 for any size image. The trade off is the cost of the extra elements versus the speed at which the thermal printer 10 can print. Factors which make such determination are, for example, the micropixel size, the diameter of the drum 16, and the ability of the lasers 34 to focus their light beams onto the dye carrier member 14. It is to be understood that if the print head 18 has a configuration which partially curve around the drum 16, more lasers can be used than if the print head 18 has a flat configuration. More particularly, the curved print head 18 would permit more light beams to be focused onto the dye carrier member 14 which would also have to contact more of the receiver member 12.

In order to print dots (micropixels) at, for example, 1800 or 2400 dpi, to create 4-color images on a receiver member 12, the laser thermal printer 10 must maintain, for example, a $\pm\frac{1}{8}$ micropixel resolution. By providing a $\pm\frac{1}{8}$ micropixel resolution in a 4-color image, the error cannot be detected by the human eye or by magnifications normally used in the graphic arts field (e.g., magnifications of 7×-20×). In accordance with the present invention, the laser thermal printer 10 controls micropixel resolution to this tolerance by close synchronization of the position of the drum 16 and the pixel timing pulses from the pixel clock 30.

Additionally, in accordance with the present invention, by specifying particular circumferences of the drum 16, non-fractional divisor values are usable for the divide-by-n circuit 48 in the pixel clock 30 arrangement of FIG. 2. More particularly, if the writing length of an image to be reproduced on the receiver member is 19.25 inches and 50,000 encoder 28 pulses per revolution of the drum 16 are used, the circumference C for the drum 16 can be determined from the equations:

$$C=(1/dpi1)\times(1/R\ PCLK)\times(n)\times(ENC/rev.), \quad (1)$$

$$C=(1/dpi2)\times(1/R\ PCLK)\times(m)\times(ENC/rev.), \quad (2)$$

where dpi1 (Equation 1) and dpi2 (Equation 2) indicate the dots per inch (e.g., 1800 and 2400 dpi, respectively); 1/R equals the desired micropixel resolution, where R=8 in the present invention to ensure precise $\frac{1}{8}$ micropixel placement; "n" (Equation 1) and "m" (Equation 2) are the number of pixel clock 30 pulses per encoder 28 pulse (e.g., 6 and 8, respectively), and (ENC/rev.) indicates the number of encoder 28 pulses per revolution of the drum 16 (50,000 encoder pulses).

For a given thermal printer 10 where dpi1=1800, dpi2=2400, R=8, and ENC/rev.=50,000, the following values for the drum circumference "C" meet the desired criteria.

| n | m | C |
|---|---|---|
| 3 | 4 | 10.417 inches |
| 6 | 8 | 20.833 inches |
| 9 | 12 | 31.250 inches |

Since the primary requirement in the thermal printer 10 is to provide a circumference "C" of the drum 16 which is equal to, or greater than, the image size (e.g., 19.25 inches) to be printed on receiver member 12, the values of n=6, m=8, and a drum 16 circumference "C" of 20.833 inches are chosen. For other configurations where a different image size is required, another set of "n", "m", and "C" values are chosen without requiring an alteration of the print head control circuitry 32.

Alternatively, by selecting a value of 40,000 encoder 28 pulses per revolution, the following circumferences "C" in equations (1) and (2) of the drum 16 meet the selected criteria of dpi1=1800, dpi2=2400, and R=8:

| n | m | C |
|---|---|---|
| 3 | 4 | 8.333 inches |
| 6 | 8 | 16.667 inches |
| 9 | 12 | 25.000 inches |

Therefore, the only change necessary to print at the two dpi1 and dpi2 values for a particular drum 16 circumference "C" is to change the value of "n" in the divide-by-n circuit 48 in the pixel timer 30 shown in FIG. 2.

In accordance with a preferred embodiment of the present invention, during the printing operation the drum 16 is rotated at a continuous speed in the direction of the arrow 60 in FIG. 4. Simultaneously therewith, the print head 18 including the plurality of lasers $\mathbf{34}_1$ to $\mathbf{34}_N$ is translated at a slower speed across the dye carrier member 14 in the direction shown by arrow 62 of FIG. 4. Each of the plurality of N laser 34 of the thermal print head 18 writes a separate column of micropixels during each revolution of the drum 16. As a result, the image is written in a helical form because the print head 18 is continuously translating (moving) in the direction of the arrow 62 as the drum 16 rotates. Therefore, by aligning a plurality of N lasers $\mathbf{34}_1$ to $\mathbf{34}_N$ at an acute angle Θ as shown in FIG. 4, N columns of the dye frame image are concurrently written during each revolution of the drum 16.

As each of the lasers 34 is writing a separate column of micropixels of the dye frame image, the lasers $\mathbf{34}_1$ to $\mathbf{34}_N$ are timed in a sequence that causes corresponding micropixels of each column to be substantially aligned across the width of the receiver member 12. In this manner, N micropixels of each line of a dye frame image are written onto the receiver member 12 during each rotation of the drum 16. More particularly, in FIG. 4, When the first row of a dye frame image is started, the first laser $\mathbf{34}_1$ is energized (fired), and the drum 16 is moved a predetermined distance in direction 60 before the second laser $\mathbf{34}_2$ is fired to place the two micropixels next to each other. The delay between the firing of the first laser $\mathbf{34}_1$ and the second laser $\mathbf{34}_2$ can take, for example, 6 or 7 pulses of the pixel clock 30. Such delay can be determined by those skilled in the art knowing various thermal printer 10 factors such as the circumference of the drum 16, the rotational speed of the drum 16, the spacing of the lasers 34 in the print head 18, the magnification of the optics that focus the light beams from the lasers 34, and the angle Θ at which the print head 18 is disposed relative to the normal to the direction 60 of the rotation of the drum 16. The number (N) of lasers 34 does not effect the delay values. By repeating this process for each of the other lasers $34_3$ to $34_N$, N micropixels of the first row across the receiver member 12 are printed.

For printing each of the second, third, and other rows of the dye frame image, the laser $34_1$ is fired sequentially at predetermined intervals synchronized to the movement of the drum 16. More particularly, the laser $34_1$ is fired every time the drum 16 moves a predetermined distance corresponding to the distance between each of the rows of the dye frame image. After the first laser $34_1$ is fired for each row of the dye frame image, the remaining lasers $34_2$ to $34_N$ are fired in the same timed sequence as described above for printing the first row of the dye frame image. In this manner, the lasers $34_1$ to $34_N$ are concurrently energized for printing the N columns of the rows of a dye frame image during each rotation of the drum 16. During each subsequent revolution of the drum 16, and while the print head 18 is translating, the next sequential plurality of N columns of the rows of the dye frame image, in the direction of translation motion 62 of the print head 18, are printed until the entire dye frame image is completed. The pulses of the pixel clock 30 are the means used to determine how long to delay the second laser $34_2$ from firing after the first laser $34_1$ has fired, and similarly how long to delay each of the other lasers $34_3$ to $34_N$ before they are fired. It is to be understood that during each revolution of the drum 16, the start of printing of a next set of N columns of micropixels, or the start of a next dye frame image, is synchronized to print the micropixels with a 1/R (R=8) micropixel resolution. It is to be further understood that during the printing of dye frame images of different colors on the same receiver member 12, the thermal printer 10 in accordance with the present invention also superimposes corresponding micropixels with a ⅛ micropixel resolution.

It is to appreciated and understood that the specific embodiments of the invention described hereinabove are merely illustrative of the general principles of the invention. Various modifications may be made by those skilled in the art which ar consistent with the principles set forth. For example, any other suitable arrangement for focusing the lasers 34 onto the dye carrier member 14 at the angle Θ can be used. Still further, the print head 18 can be modified to include resistive thermal pixels instead of the lasers 34 which contact the dye carrier member 14 at the angle Θ shown in FIG. 4. Still further, instead of continuously translating the print head 18 across the dye carrier member 14, the print head 18 can be moved in a "step and stare" manner. More particularly, in the "step and stare" movement the print head 18 is held stationary while printing the first N columns of micropixels. During the time period between the completion of the printing of the last row of the N columns of a dye frame image and the start of printing of the next N columns of the first line of that dye frame image, the print head 18 is translated in the direction 62 of FIG. 4 to print the next N columns of micropixels. This translation of the print head 18 continues in this manner until all of the columns of a dye frame image are completed. Then the print head 18 is translated to the left to start printing the first N columns of the next dye frame image.

What is claimed is:

1. A thermal dye transfer apparatus in which dye is transferred by sublimation from a dye carrier member to a receiver member mounted on a rotatable drum by heating the dye in the dye carrier member to produce a dye frame image, the apparatus comprising:

a print head comprising a plurality of N heat producing elements for producing a selective amount of heat at each of a plurality of N micropixels on the dye carrier member for selectively transferring a predetermined amount of the dye from the dye carrier member to the receiver member, the plurality of N elements being aligned at a predetermined acute angle Θ from a line normal to the direction of rotation of the drum, where $0<\Theta<90$ degrees;

means responsive to a plurality of drum position signals indicating a plurality of radial positions of the drum during each rotation thereof for generating a predetermined number of micropixel timing pulses which are a non-fractional multiple of a rate of the plurality of drum position signals and are synchronized to the plurality of drum position signals as the drum is rotating; and means responsive to the micropixel timing pulses and to image signals indicative to a dye density level at each micropixel of the dye frame image to be reproduced on the receiver member for sequentially energizing each of the plurality of N heat producing elements to produce N separate columns of micropixels of the dye frame image during each rotation of the drum, whereby corresponding micropixels of the N columns of micropixels are aligned in parallel substantially normal to the rotation of the drum on the receiver member.

2. The thermal dye transfer apparatus of claim 1 wherein the means for sequentially energizing each of the plurality of N heat producing elements comprises:

an encoder rigidly mounted to a shaft of the drum for producing a predetermined plurality of encoder output pulses during each revolution of the drum, each encoder output pulse being generated at a separate one of the plurality of equally spaced radial position of the drum as the drum is rotating; and micropixel clock generating means responsive to the encoder output pulses for generating a plurality of K output micropixel clock pulses for each encoder output pulse which are synchronized to the encoder output pulses.

3. The thermal dye transfer apparatus of claim 2 wherein the micropixel clock generating means in a phase lock loop comprising:

a divide-by-n feedback circuit responsive to the output micropixel clock pulses for generating one reference output pulse during each $n^{th}$ output micropixel clock pulse, where "n" is a non-fractional number;

means for comparing the phase of each encoder output pulse and the phase circuit and for synchronizing the output micropixel clock pulse to the encoder output pulses.

4. The thermal dye transfer apparatus of claim 2 wherein the circumference "C" of the drum is determined from the equation $$C=(1/dpi)\times(1/R)\times(n)\times(ENC/rev.),$$

where dpi is the dots per inch to be printed, R is the number of micropixel clock pulses needed to write one micropixel, "n" is the a non-fractional number of micropixel clock pulses per encoder output pulse sufficient to provide a predetermined length dye frame image, and (ENC/rev.) indicates the number of encoder output pulses per revolution of the drum.

5. The thermal dye transfer apparatus of claim 1 wherein each of the heat producing means is a laser producing a light beam which is focused onto a separate micropixel area of the dye carrier member.

6. The thermal dye transfer apparatus of claim wherein each of the heat producing means is a resistive heating element contacting the dye carrier member during a each period of dye transfer from the dye carrier member to the receiver member.

7. A thermal dye transfer apparatus in which dye is transferred by sublimation from a dye carrier member to a receiver member by heating the dye in the dye carrier member to produce a dye frame image, the apparatus comprising:

a rotatable cylindrical drum having a predetermined circumference for mounting the receiver member thereon such that the distance around the circumference is at least as large as a length of the dye frame image to be printed on the receiver member.

a print head comprising a plurality of N heat producing elements for producing a selective amount of heat at each of a plurality of N micropixels on the dye carrier member for selectively transferring a predetermined amount of the dye from the dye carrier member to the receiver member, the plurality of N elements being aligned at a predetermined acute angle $\Theta$ from a line normal to the direction of rotation of the drum, where $0<\Theta<90$ degrees;

means responsive to a plurality of drum position signals indicating radial positions of the drum during each rotation thereof for producing micropixel timing signals which are a non-fractional multiple of a rate of the plurality of drum position signals and are synchronized to the rotational speed of the drum; and means responsive to the micropixel timing signals and to image signals indicative of a dye density level at each micropixel of the dye frame image to be reproduced on the receiver member for sequentially energizing each of the plurality of N heat producing elements to produce N separate columns of micropixels of the dye frame image during each rotation of the drum, whereby corresponding micropixels of the N columns of micropixels are aligned in parallel substantially normal to the rotation of the drum of the receiver member.

8. The thermal dye transfer apparatus of claim 7 wherein each of the heat producing means is a laser producing a light beam which is focused onto a separate micropixel area of the dye carrier member.

9. The thermal dye transfer apparatus of claim 7 wherein each of the heat producing means is a resistive heating element contacting the dye carrier member during a each period of dye transfer from the dye carrier member to the receiver member.

10. The thermal dye transfer apparatus of claim 7 wherein the apparatus further comprises means for translating the print head at a predetermined speed normal to the rotation of the drum while a dye frame image is being printed.

11. The thermal dye transfer apparatus of claim 10 wherein the means for translating the print head continuously translates the print head in a first direction normal to the rotation of the drum during the printing of a dye frame image.

12. The thermal dye transfer apparatus of claim 10 wherein the print head translating means maintains the print head in a fixed position during the printing of each of the N columns of micropixels of a dye frame image, and translates the print head in a first direction normal to the rotation of the drum between the printing of each of the N columns of micropixels of the dye frame image so that each of the N columns of the dye frame image is positioned next to the previously printed N columns of micropixels of the dye frame image.

13. The thermal dye transfer apparatus of claim 7 wherein the micropixel timing signals and the drum position signals are pulses, and the means for producing micropixel timing signal comprises:

an encoder rigidly mounted to a shaft of the drum for producing a predetermined plurality of drum position output pulses during each revolution of the drum, each drum position output pulse being generated at a separate one of a plurality of equally spaced radial positions of the drum as the drum is rotating; and micropixel clock generating means responsive to the drum position output pulses for generating a plurality of N output micropixel clock pulses for each drum position output pulse which are synchronized to the drum position output pulses.

14. The thermal dye transfer apparatus of claim 13 wherein the micropixel clock generating means is a phase lock loop comprising:

a divide-by-n feedback circuit responsive to the output micropixel clock pulses for generating one reference output pulse during each nth output micropixel clock pulse, where "n" is a non-fractional number;

means for comparing the phase of each drum position output pulse and the phase of the reference pulse from the feedback circuit and synchronizing the output micropixel clock pulses to the drum position output pulses.

15. The thermal dye transfer apparatus of claim 7 wherein the micropixel timing signals and the drum position signals are pulses, and the circumference "C" of the drum is determined from the equation $$C=(1/dpi)\times(1/R)\times(n)\times(ENC/rev.),$$

where dpi is the dots per inch to be printed, R is the number of micropixel clock pulses needed to write one micropixel, "n" is the a non-fractional number of micropixel clock pulses per drum position output pulse sufficient to provide a predetermined length dye frame image, and (ENC/rev.) indicates the number of drum position output pulses per revolution of the drum.

* * * * *